(12) United States Patent
Zimmerman

(10) Patent No.: US 6,411,289 B1
(45) Date of Patent: *Jun. 25, 2002

(54) MUSIC VISUALIZATION SYSTEM UTILIZING THREE DIMENSIONAL GRAPHICAL REPRESENTATIONS OF MUSICAL CHARACTERISTICS

(76) Inventor: Franklin B. Zimmerman, 225 S. 42nd St., Philadelphia, PA (US) 19104

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,422

(22) Filed: Aug. 7, 1997

Related U.S. Application Data

(60) Provisional application No. 60/023,511, filed on Aug. 7, 1996.

(51) Int. Cl.[7] ............................ G06F 15/00; G10G 3/04; G09B 15/02
(52) U.S. Cl. ............................ 345/302; 84/462; 84/477; 84/483
(58) Field of Search .......................... 84/462, 483, 637, 84/477, 626, 1.01, 609, 649, 470; 364/419; 345/302

(56) References Cited

U.S. PATENT DOCUMENTS

| | | | | |
|---|---|---|---|---|
| 3,698,277 A | * | 10/1972 | Barra ........................ | 84/483 |
| 3,769,872 A | * | 11/1973 | Andrews .................... | 84/470 |
| 4,603,386 A | * | 7/1986 | Kjaer ........................ | 364/419 |
| 4,664,010 A | * | 5/1987 | Sestero ...................... | 84/1.01 |
| 5,088,380 A | * | 2/1992 | Minamitaka ................ | 84/637 |
| 5,146,833 A | * | 9/1992 | Lui ............................ | 84/462 |
| 5,525,749 A | * | 6/1996 | Aoki .......................... | 84/609 |
| 5,663,517 A | * | 9/1997 | Oppenheim ................ | 84/649 |
| 5,728,960 A | * | 3/1998 | Sitrick ........................ | 84/477 |

OTHER PUBLICATIONS

Stephen Malinowski, The Music Animation Machine, Software Application as Described and Downloaded at URL: <http://www.well.com/user/smalin/mam.html>, downloaded on Jun. 30, 2000, pp. 1–28, Jul. 1993.*

Stephen Malinowski, Music Animation Machine User Guide, pp. 1–29, Oct. 1994.*

Alec Nisbett, The Sound Studio–6th Edition, Butterworth–Heinemann Ltd, Oxford England, pp. 14–16, 1995.*

Pennycook, Bruce W., Computer–Music Interfaces: a Survey, ACM Computing Surveys, vol. 17, Issue 2, pp. 267–289, 1985.*

Graphical Depiction of G. F. Handel's "Messiah 1 Sinfony", 1 colored sheet of drawing.

* cited by examiner

Primary Examiner—Stephen S. Hong
Assistant Examiner—William L. Bashore
(74) Attorney, Agent, or Firm—Woodock Washburn LLP

(57) ABSTRACT

A computer system for producing a three dimensional illustration of a musical work includes determining for each sound of the musical work its tone, harmony and tonality. Each of these characteristics of the musical work is assigned a value so that it can be displayed on a three-dimensional graph having a time axis, a tone axis and a harmony axis. By plotting the tone and the harmony of each sound as a function of time on a graph, a three-dimensional illustration of a musical composition can be created. By visually inspecting the graph one can determine the tone, the harmony and the tonality of each sound by locating its position on the graph. The graph may also be colored with a color corresponding to the tone, harmony and tonality of a sound being played. Thus, in addition to determining the musical characteristics by locating the position of each sound on the graph, they can also be determined by noting the color of each sound displayed on the graph. A computer system for producing this graph contains an input device for inputting the characteristics of the musical composition to a computer programmable memory. The microprocessor can be controlled by the readable programmable memory that has stored numeric values corresponding to the tone, the harmony and the tonality of the sounds of the musical work.

21 Claims, 12 Drawing Sheets

FIG. 4A

|   | A | B | C | D | E | F | G | H | I | J | K | L | M | N |
|---|---|---|---|---|---|---|---|---|---|---|---|---|---|---|
| 1 | 1 | | | Melodic Code (Tones) | | | | | | | Harmonic Code | | | |
| 2 | Note | CCC | CCC | Oc.3 | Oc.4 | Oc.5 | Oc.6:cc | Oc.7:cc | Oc.8:cccc | | Triad | 7th | 8th | 11th |
| 3 | B# | | | 0 | 31 | 62 | 93 | 124 | 155 | | 0 | | | |
| 4 | C | | | 1 | 32 | 63 | 94 | 125 | 156 | C | 1 | 101 | 102 | 103 |
| 5 | BX | | | 2 | 33 | 64 | 95 | 126 | 157 | | 2 | 201 | 202 | 203 |
| 6 | C# | | | 3 | 34 | 65 | 96 | 127 | 158 | C# | 3 | 301 | 302 | 303 |
| 7 | Db | | | 4 | 35 | 66 | 97 | 128 | 159 | Db | 4 | 401 | 402 | 403 |
| 8 | Cx | | | 5 | 36 | 67 | 98 | 129 | 160 | | 5 | 501 | 502 | 503 |
| 9 | D | | | 6 | 37 | 68 | 99 | 130 | 161 | D | 6 | 601 | 602 | 603 |
| 10 | Ebb | | | 7 | 38 | 69 | 100 | 131 | 162 | Eb | 7 | 701 | 702 | 703 |
| 11 | D# | | | 8 | 39 | 70 | 101 | 132 | 163 | D# | 8 | 801 | 802 | 803 |
| 12 | Eb | | | 9 | 40 | 71 | 102 | 133 | 164 | Eb | 9 | 901 | 902 | 903 |
| 13 | FbbDx | | | 10 | 41 | 72 | 103 | 134 | 165 | | 10 | | | |
| 14 | E | | | 11 | 42 | 73 | 104 | 135 | 166 | E | 11 | 1101 | 1102 | 1103 |
| 15 | Fb | | | 12 | 43 | 74 | 105 | 136 | 167 | | 12 | 1201 | 1202 | 1203 |
| 16 | E# | | | 13 | 44 | 75 | 106 | 137 | 168 | | 13 | 1301 | 1302 | 1303 |
| 17 | F | | | 14 | 45 | 76 | 107 | 138 | 169 | F# | 14 | 1401 | 1402 | 1403 |
| 18 | Gbb | | | 15 | 46 | 77 | 108 | 139 | 170 | | 15 | 1501 | 1502 | 1503 |
| 19 | F# | | | 16 | 47 | 78 | 109 | 140 | 171 | | 16 | 1601 | 1602 | 1603 |
| 20 | Gb | | | 17 | 48 | 79 | 110 | 141 | 172 | | 17 | 1701 | 1702 | 1703 |
| 21 | Fx | | | 18 | 49 | 80 | 111 | 142 | 173 | | 18 | 1801 | 1802 | 1803 |
| 22 | G | | | 19 | 50 | 81 | 112 | 143 | 174 | G | 19 | 1901 | 1902 | 1903 |
| 23 | Abb | | | 20 | 51 | 82 | 113 | 144 | 175 | | 20 | 2001 | 2002 | 2003 |
| 24 | G# | | | 21 | 52 | 83 | 114 | 145 | 176 | G# | 21 | 2101 | 2102 | 2103 |
| 25 | Ab | | | 22 | 53 | 84 | 115 | 146 | 177 | Ab | 22 | 2201 | 2202 | 2203 |
| 26 | Gx | | | 23 | 54 | 85 | 116 | 147 | 178 | | 23 | 2301 | 2302 | 2303 |
| 27 | A | | | 24 | 55 | 86 | 117 | 148 | 179 | A | 24 | 2401 | 2402 | 2403 |
| 28 | Bbb | | | 25 | 56 | 87 | 118 | 149 | 180 | | 25 | 2501 | 2502 | 2503 |
| 29 | A# | | | 26 | 57 | 88 | 119 | 150 | 181 | A# | 26 | 2601 | 2602 | 2603 |
| 30 | Bb | | | 27 | 58 | 89 | 120 | 151 | 182 | Bb | 27 | 2701 | 2702 | 2703 |
| 31 | Cbb | | | 28 | 59 | 90 | 121 | 152 | 183 | | 28 | 2801 | 2802 | 2803 |
| 32 | B | | | 29 | 60 | 91 | 122 | 153 | 184 | B | 29 | 2901 | 2902 | 2903 |
| 33 | Cb | | | 30 | 61 | 92 | 123 | 154 | 185 | | 30 | 3001 | 3002 | 3003 |

FIG. 4B
| | A | B | C | D | E | F | G | H | I | J | K | L | M | N |
|---|---|---|---|---|---|---|---|---|---|---|---|---|---|---|
| 34 | | | | | | | | | Dynamics | | TEXTURES | | | |
| 35 | | | | | | | | | ffff:10 | | 1:fugal | | | |
| 36 | | | | | | | | | fff:9 | | 2:homophonic | | | |
| 37 | | | T//S Incl stress patterns | | | | | | ff:8 | | | | | |
| 38 | | | 4//4 1-2-3-4/ | | | | | | f:7 | | | | | |
| 39 | | | 2//4 1-2/1-2/ | | | | | | mf:6 | | | | | |
| 40 | | | 3//4 1-2-3/1-2-3 | | | | | | | | | | | |
| 41 | | | 5//8 1-2-3-4-5-/ or: | | | | | | mp:5 | | | | | |
| 42 | | | 5//8 1 -2-3-4-5-/ | | | | | | p:4 | | | | | |
| 43 | | | 6//8:1 -2-3-4-5-6-/ | | | | | | pp:3 | | | | | |
| 44 | | | 7//8:1-2-3-4-5-6-7-/0R: | | | | | | ppp:2 | | | | | |
| 45 | | | 7//8:1-2-3-4-5-6-7-/ | | | | | | pppp:1 | | | | | |
| 46 | | | 8//8 1-2-3-4-5-6-7-8-/0R | | | | | | | | | | | |
| 47 | | | 8//8 1-2-3-4-5-6-7-8-/0R | | | | | | | | | | | |
| 48 | | | 8//8 1-2-3-4-5-6-7-8-/0R: | | | | | | | | | | | |
| 49 | | | 8//8 1-2-3-4-5-6-7-8-/ | | | | | | | | | | | |
| 50 | | | 9//8: 1-2-3-4-5-6-7-8-9-/ | | | | | | | | | | | |
| 51 | | | 12/8:1 -2-3-4-5-6-7-8-9-10-11-12-/ | | | | | | | | | | | |
| 52 | | | Other patterns reserved for other sound scapes | | | | | | | | | | | |
| 53 | | | | | | | | | | | | | | |
| 54 | | | | | | | | | | | | | | |
| 55 | | | | | | | | | | | | | | |
| 56 | | | | | | | | | | | | | | |
| 57 | | | | | | | | | | | | | | |
| 58 | | | | | | | | | | | | | | |
| 59 | | | | | | | | | | | | | | |
| 60 | | | | | | | | | | | | | | |
| 61 | | | | | | | | | | | | | | |
| 62 | | | | | | | | | | | | | | |
| 63 | | | | | | | | | | | | | | |
| 64 | | | | | | | | | | | | | | |
| 65 | | | | | | | | | | | | | | |

FIG. 4C

|   | O | P | Q | R | S | T | U | V | W | X | Y | Z | AA |
|---|---|---|---|---|---|---|---|---|---|---|---|---|---|
| 1 | (Major Chords) | | | | | | | | Harmonic Code (Minor Chords) | | | | |
| 2 | 13th | A7 | A9 | 6thCd | C1st | M/m | | | | 7th | 9th | 11th | 13th |
| 3 | | | | | | | | | | | | | |
| 4 | 104 | 105 | 106 | 107 | 108 | 109 | 110 | 111 | 150 | 151 | 152 | 153 | 154 |
| 5 | 204 | 205 | 206 | 207 | 208 | 209 | 210 | 211 | 250 | 251 | 252 | 253 | 254 |
| 6 | 304 | 305 | 306 | 307 | 308 | 309 | 310 | 311 | 350 | 351 | 352 | 353 | 354 |
| 7 | 404 | 405 | 406 | 407 | 408 | 409 | 410 | 411 | 450 | 451 | 452 | 453 | 454 |
| 8 | 504 | 505 | 506 | 507 | 508 | 509 | 510 | 511 | 550 | 551 | 552 | 553 | 554 |
| 9 | 604 | 605 | 606 | 607 | 608 | 609 | 610 | 611 | 650 | 651 | 652 | 653 | 654 |
| 10 | 704 | 705 | 706 | 707 | 708 | 709 | 710 | 711 | 750 | 751 | 752 | 753 | 754 |
| 11 | 804 | 805 | 806 | 807 | 808 | 809 | 810 | 811 | 850 | 851 | 852 | 853 | 854 |
| 12 | 904 | 905 | 906 | 907 | 908 | 909 | 910 | 911 | 950 | 951 | 952 | 953 | 954 |
| 13 | | | | | | | | | | | | | |
| 14 | 1104 | 1105 | 1106 | 1107 | 1108 | 9 | 10 | 1111 | 1150 | 51 | 52 | 53 | 54 |
| 15 | 1204 | 1205 | 6 | 7 | 8 | 9 | 10 | 1211 | 1250 | 51 | 52 | 53 | 54 |
| 16 | 1304 | 1305 | 6 | 7 | 8 | 9 | 10 | 1311 | 1350 | 51 | 52 | 53 | 54 |
| 17 | 1404 | 1405 | 1406 | 1407 | 8 | 1409 | 10 | 1411 | 1450 | 51 | 1452 | 53 | 1454 |
| 18 | 1504 | 1505 | 6 | 1507 | 8 | 1509 | 10 | 1511 | 1550 | 51 | 1552 | 53 | 54 |
| 19 | 1604 | 1605 | 6 | 1607 | 8 | 1609 | 10 | 1611 | 1650 | 1651 | 52 | 1653 | 54 |
| 20 | 1704 | 1705 | 6 | 7 | 1708 | 9 | 10 | 11 | 1750 | 51 | 1752 | 53 | 54 |
| 21 | 1804 | 1805 | 6 | 7 | 8 | 9 | 10 | 11 | 1850 | 51 | 52 | 53 | 54 |
| 22 | 1904 | 1905 | 6 | 7 | 8 | 9 | 10 | 11 | 1990 | 51 | 52 | 53 | 54 |
| 23 | 2004 | 2005 | 6 | 7 | 8 | 9 | 10 | 11 | 2050 | 51 | 52 | 53 | 54 |
| 24 | 2104 | 2105 | 6 | 7 | 8 | 9 | 10 | 11 | 2150 | 51 | 52 | 53 | 54 |
| 25 | 2204 | 2205 | 6 | 7 | 8 | 9 | 10 | 11 | 2250 | 51 | 52 | 53 | 54 |
| 26 | 2304 | 2305 | 6 | 7 | 8 | 9 | 10 | 11 | 2350 | 51 | 52 | 53 | 54 |
| 27 | 2404 | 2405 | 6 | 7 | 8 | 9 | 10 | 11 | 2450 | 51 | 52 | 53 | 54 |
| 28 | 2504 | 2505 | 6 | 7 | 8 | 9 | 10 | 11 | 2550 | 51 | 52 | 53 | 54 |
| 29 | 2604 | 2605 | 6 | 7 | 8 | 9 | 10 | 11 | 2650 | 51 | 52 | 53 | 54 |
| 30 | 2704 | 2705 | 6 | 7 | 8 | 9 | 10 | 11 | 2750 | 51 | 52 | 53 | 54 |
| 31 | 2804 | 2805 | 6 | 7 | 8 | 9 | 10 | 11 | 2850 | 51 | 52 | 53 | 54 |
| 32 | 2904 | 2905 | 6 | 7 | 8 | 9 | 10 | 11 | 2950 | 51 | 52 | 53 | 54 |
| 33 | 3004 | 3005 | 6 | 7 | 8 | 9 | 10 | 11 | 3050 | 51 | 52 | 53 | 54 |

FIG. 4D

|    | O | P | Q | R | S | T | U | V | W | X | Y | Z | AA |
|----|---|---|---|---|---|---|---|---|---|---|---|---|----|
| 34 |   |   |   |   |   |   |   |   |   |   |   |   |    |
| 35 |   |   |   |   |   | Orchestrational & Choral | | | | | | | |
| 36 |   |   |   |   |   |   |   |   |   |   |   |   |    |
| 37 |   |   |   |   |   |   |   |   |   |   |   |   |    |
| 38 |   |   |   |   |   | woodwinds | 1 | strings | 20 |   |   |   |    |
| 39 |   |   |   |   |   | piccolo | 2 | violin 1 | 21 |   |   |   |    |
| 40 |   |   |   |   |   | flute | 3 | violin 2 | 22 |   |   |   |    |
| 41 |   |   |   |   |   | oboes | 4 | viola | 23 |   |   |   |    |
| 42 |   |   |   |   |   | cor angles | 5 | cello | 24 |   |   |   |    |
| 43 |   |   |   |   |   | clarinet | 6 | contra bass | 25 |   |   |   |    |
| 44 |   |   |   |   |   | alto clarinet | 7 | viola d gamba | 26 |   |   |   |    |
| 45 |   |   |   |   |   | bass clarinet | 8 | treble viol | 27 |   |   |   |    |
| 46 |   |   |   |   |   | bassett horn | 9 | alto viol | 28 |   |   |   |    |
| 47 |   |   |   |   |   | bassoon | 10 | tenor viol | 29 |   |   |   |    |
| 48 |   |   |   |   |   | contra bassoon | 10.5 | organ | 30 |   |   |   |    |
| 49 |   |   |   |   |   | bass | 11 | percussion | 31 |   |   |   |    |
| 50 |   |   |   |   |   | trumpet | 12 | Celeste | 32 |   |   |   |    |
| 51 |   |   |   |   |   | french horn | 13 | harpsichord | 33 |   |   |   |    |
| 52 |   |   |   |   |   | trombone | 14 | piano | 34 |   |   |   |    |
| 53 |   |   |   |   |   | tuba | 15 | marimba | 35 |   |   |   |    |
| 54 |   |   |   |   |   | bass trombone | 16 | xylophone | 36 |   |   |   |    |
| 55 |   |   |   |   |   |   |   |   |   |   |   |   |    |
| 56 |   |   |   |   |   |   |   |   |   |   |   |   |    |
| 57 |   |   |   |   |   |   |   |   |   |   |   |   |    |
| 58 |   |   |   |   |   |   |   |   |   |   |   |   |    |
| 59 |   |   |   |   |   |   |   |   |   |   |   |   |    |
| 60 |   |   |   |   |   |   |   |   |   |   |   |   |    |
| 61 |   |   |   |   |   |   |   |   |   |   |   |   |    |
| 62 |   |   |   |   |   |   |   |   |   |   |   |   |    |
| 63 |   |   |   |   |   |   |   |   |   |   |   |   |    |
| 64 |   |   |   |   |   |   |   |   |   |   |   |   |    |
| 65 |   |   |   |   |   |   |   |   |   |   |   |   |    |

FIG. 4E

|    | AB   | AC   | AD   | AE   | AF   | AG   | AH   | AI   | AJ   |
|----|------|------|------|------|------|------|------|------|------|
| 1  |      |      |      |      |      |      |      |      |      |
| 2  | A7   | A9   | Dm7  | C1st | M/m  |      |      |      |      |
| 3  |      |      |      |      |      |      |      |      |      |
| 4  | 155  | 156  | 157  | 158  | 159  | 160  | 161  | 162  | 163  |
| 5  | 255  | 256  | 257  | 258  | 259  | 260  | 261  | 262  | 263  |
| 6  | 355  | 356  | 357  | 358  | 359  | 360  | 361  | 362  | 363  |
| 7  | 455  | 456  | 457  | 458  | 459  | 460  | 461  | 462  | 463  |
| 8  | 555  | 556  | 557  | 558  | 559  | 560  | 561  | 562  | 563  |
| 9  | 655  | 656  | 657  | 658  | 659  | 660  | 661  | 662  | 663  |
| 10 | 755  | 756  | 757  | 758  | 759  | 760  | 761  | 762  | 763  |
| 11 | 855  | 856  | 857  | 858  | 859  | 860  | 861  | 862  | 863  |
| 12 | 955  | 956  | 957  | 958  | 959  | 960  | 961  | 962  | 963  |
| 13 |      |      |      |      |      |      |      |      |      |
| 14 | 55   | 56   | 57   | 58   | 59   | 60   | 61   | 1062 | 1163 |
| 15 | 55   | 56   | 57   | 58   | 59   | 60   | 61   | 1162 | 1263 |
| 16 | 55   | 56   | 57   | 58   | 59   | 60   | 61   | 1362 | 1363 |
| 17 | 55   | 1456 | 57   | 1458 | 59   | 1460 | 61   | 1462 | 1463 |
| 18 | 1555 | 56   | 1557 | 58   | 1559 | 60   | 1561 | 1562 | 1563 |
| 19 | 1655 | 56   | 57   | 58   | 59   | 1660 | 61   | 1662 | 1663 |
| 20 | 55   | 1756 | 57   | 58   | 59   | 60   | 61   | 1762 | 1753 |
| 21 | 55   | 56   | 57   | 58   | 59   | 60   | 61   | 1862 | 1863 |
| 22 | 55   | 56   | 57   | 58   | 59   | 60   | 61   | 1962 | 1963 |
| 23 | 55   | 56   | 57   | 58   | 59   | 60   | 61   | 2062 | 2063 |
| 24 | 55   | 56   | 57   | 58   | 59   | 60   | 61   | 2162 | 2163 |
| 25 | 55   | 56   | 57   | 58   | 59   | 60   | 61   | 2262 | 2263 |
| 26 | 55   | 56   | 57   | 58   | 59   | 60   | 61   | 2362 | 2363 |
| 27 | 55   | 56   | 57   | 58   | 59   | 60   | 61   | 2462 | 2463 |
| 28 | 55   | 56   | 57   | 58   | 59   | 60   | 61   | 2562 | 2563 |
| 29 | 55   | 56   | 57   | 58   | 59   | 60   | 61   | 2662 | 2663 |
| 30 | 55   | 56   | 57   | 58   | 59   | 60   | 61   | 2762 | 2763 |
| 31 | 55   | 56   | 57   | 58   | 59   | 60   | 61   | 2862 | 2863 |
| 32 | 55   | 56   | 57   | 58   | 59   | 60   | 61   | 2962 | 2963 |
| 33 | 55   | 56   | 57   | 58   | 59   | 60   | 61   | 3062 | 3063 |

FIG. 4F

|    | AK | AL | AM | AN |
|----|----|----|----|----|
| 1  |    | Affects |  |  |
| 2  | 1  | Acclamatory | cardinal |  |
| 3  | 4  | Afraid (fear) | yellow |  |
| 4  | 7  | Angry (war like) | indigo |  |
| 5  | 8  | Awed | purple |  |
| 6  | 9  | bitter | mauve |  |
| 7  | 11 | bold | fuchsia |  |
| 8  | 13 | bucolic | pale pink |  |
| 9  | 15 | capricious | aquamarine |  |
| 10 | 16 | caring | violet 1 |  |
| 11 | 18 | comic | deep pink |  |
| 12 | 19 | coquettish | light green |  |
| 13 | 20 | courageous | blue |  |
| 14 | 25 | crazy | grey |  |
| 15 | 27 | dainty | light pink |  |
| 16 | 28 | depressed | dark blue |  |
| 17 | 30 | dream like | pale violet |  |
| 18 | 32 | elegaic | deep purple |  |
| 19 | 34 | emulative | chartreuse |  |
| 20 | 36 | envious | light green |  |
| 21 | 40 | excited | rosy red |  |
| 22 | 42 | fearful | gandious |  |
| 23 | 44 | fearsome | dark grey |  |
| 24 | 50 | funerial | navy 1 |  |
| 25 | 53 | fun loving | pink |  |
| 26 | 55 | funny | deep pink |  |
| 27 | 60 | gay | light red |  |
| 28 | 63 | glorious | indigo 2 |  |
| 29 | 64 | grand | indigo 3 |  |
| 30 | 65 | greedy | dark green |  |
| 31 | 67 | grieving | blue 2 |  |
| 32 | 70 | happy | bright red |  |
| 33 | 80 | hateful | indigo 4 |  |

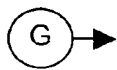

FIG. 4G

|   | AK | AL | AM | AN |
|---|---|---|---|---|
| 34 | 82 | jealous | lincoln green | |
| 35 | 84 | joyful | bright red 2 | |
| 36 | 86 | lazy | pale purple | |
| 37 | 88 | longing | blue purple | |
| 38 | 92 | love | orange 1 | |
| 39 | 94 | manic | crimson 2 | |
| 40 | 95 | merry | light pink | |
| 41 | 96 | mirth | burgundy | |
| 42 | 98 | morose | purple grey | |
| 43 | 100 | mysterious | sienna | |
| 44 | 110 | nostalgic | blue violet | |
| 45 | 112 | pathetic | blue grey | |
| 46 | 120 | pensive | medium grey | |
| 47 | 126 | proud | blue 4 | |
| 48 | 130 | querulous | violet blue | |
| 49 | 131 | quiet/calm | saffron | |
| 50 | 132 | rebellious | crimson 3 | |
| 51 | 136 | romantic | orange 2 | |
| 52 | 138 | rueful | violet grey | |
| 53 | 141 | sad | violet 3 | |
| 54 | 142 | sympathy | sapphire | |
| 55 | 150 | sentimental | purple 3 | |
| 56 | 151 | terror | yellow orange | |
| 57 | 152 | triumph | cardinal 2 | |
| 58 | 154 | tragic | navy 2 | |
| 59 | 159 | vane | blue 5 | |
| 60 | 160 | vehement | crimson 4 | |
| 61 | 162 | vicious | crimson 5 | |
| 62 | 164 | victorious | cardinal 3 | |
| 63 | 170 | virile | pink 3 | |
| 64 | 180 | wild | red 4 | |
| 65 | 185 | wrathful | crimson 6 | |

FIG. 5

| Note | Harm/Ton. | Color Name | RGB No. | Melodic code nos |
|---|---|---|---|---|
| F | Major | Light goldenrod | 238,221,130 | 14,45,76,107,138,169 |
| f | Minor | Dark goldenrod | 184,134,11 | |
| C | Major | White | 255,255,255 | 1,32,63,94,125,156 |
| c | Minor | Light grey | 10,10,10 | |
| G | Major | Red | 255,0,0 | 19,50,81,112,143,174 |
| g | Minor | Tomato | 255,99,71 | |
| D | Major | Sea green | 60,179,113 | 6,37,68,99,130,161 |
| d | Minor | Dark green | 0,100,0 | |
| A | Major | Pale violet red | 176,48,96 | 24,55,86,117,148,179 |
| a | Minor | Violet red | 208,32,144 | |
| E | Major | Lemon yellow | 255,255,224 | 11,42,73,104,135,166 |
| e | Minor | Gold yellow | 255,215,0 | |
| B | Major | Medium Orchid | 86,85,21 | 29,60,91,122,153,184 |
| b | Minor | Orchid | 218,112,214 | |
| F# | Major | Light pink | 255,182,193 | 16,47,78,109,140,171 |
| f# | Minor | Deep pink | 255,20,147 | |
| C# | Major | Light cyan | 224,255,255 | 3,34,65,96,127,1581 |
| c# | Minor | Cyan | 0,255,255 | |
| G# Colors | Major | Grey | 102,205,170 | 21,52,83,114,145,176 |
| g# | Minor | Dark grey | 127,255,212 | |
| D# | Major | Light brown | 255,261,261 | 8,39,70,101,132,163 |
| d# | Minor | Dark brown | 255,127,301 | |
| A# | Major | Beige | 245,245,220 | 26,57,88,119,150,181 |
| a# | Minor | Peru | 205,133,63 | |
| E# | Major | Lime green | 50,205,50 | 13,44,75,106,137,168 |
| e# | Minor | Forest green | 34,139,34 | |
| B# | Major | Blue violet | 138,43,226 | 0,31,62,93,124,155 |
| b# | Minor | Dark violet | 148,0,211 | |
| F-flat | Major | Light Sky-blue | 135,206,250 | |
| f-flat | minor | Sky blue | 135,206,235 | |
| C-flat | Major | Dark slateblue | 72,61,139 | 30,61,92,123,154,185 |
| c-flat | Minor | Navy | 0,0,128 | |
| G-flat | Major | Light salmon | 250,128,114 | 17,48,79,110,141,172 |
| g-flat | Minor | Salmon | 250,128,114 | |
| D-flat Major | Major | Cornflower blue | 100,149,237 | 4,35,65,96,127,158 |
| D-flat Major | Minor | Midnight blue | 25,25,112 | |
| A-flat | Major | Brown | 165,42,42 | 22,53,84,115,146,177 |
| a-flat | Minor | Chocolate | 210,205,30 | |
| E-flat | Major | Light purple | 55,48,255 | 9,40,71,102,133,164 |
| e-flat | Minor | Medium purple | 93,71,139 | |
| B-flat | Major | Orange | 255,165,0 | 27,60,91,122,1523,184 |
| b-flat | Minor | Dark orange | 255,140,0 | |

MUSIC VISUALIZATION SYSTEM UTILIZING THREE DIMENSIONAL GRAPHICAL REPRESENTATIONS OF MUSICAL CHARACTERISTICS

CROSS REFERENCE TO RELATED APPLICATION

This application claims the benefit of the filing date of U.S. Provisional Application No. 60/023,511, filed Aug. 7, 1996.

BACKGROUND OF THE INVENTION

This invention relates to a computer system for and a method for producing a graphical representation of a musical work. In particular, this invention relates to a system and method for graphically illustrating the tones, harmonies, tonalities and other characteristics of a musical work.

Development of the new art and science of harmonic progression and tonal modulation during the evolution of Western musical culture from the Renaissance to the Baroque stylistic era introduced a third dimension into music, in much the same way that perspective was introduced in the history of visual art-works shortly before the time in question. Thus, there is a direct parallel between the musical achievements of composers Like da Rore, Marenzio, Gesualdo and Monteverdi on the one hand, and those of painters and architects such as Leon Battista Alberti, Brunelleschi, Leonardo and Piero delia Francesca on the other. The art of music which held sway from Monteverdi to Wagner is called "tonal music," "tonality" being the quality which distinguishes it from earlier compositions, or from some of those of the present century. Tonality relates to loyalty to a tonic note and "home key." The art of changing from one tonality to another is called "modulation." The present invention visually illustrates the ways in which tonality serves as a third dimension in music, which had tended to seem two-dimensional until about the end of the Renaissance. Similarly, paintings and drawings had been mainly two-dimensional until the appearance of Alberti's treatises, De picture praestantissima, in 1435, and Della pittura (1436). In music, as in painting and drawing, the new dimension added depth and a sense of reality to the art-form.

Generally, a musical work has a plurality of sounds that occur as a function of time. Each of these sounds can be described in terms of its musical characteristics, such as tone, harmony and tonality. A tone or melodic note is defined as a musical sound of a definite pitch. A harmony is a simultaneous combination of sounds and may in some instances be referred to as a chord. A tonality of a musical work is its central tone or key, and melody refers to the succession of tones.

One method of determining a tone, a harmony or a tonality of a musical work is to train a person to be able to identify them aurally. This method involves one of the physical senses, hearing. Another method of determining the characteristics of a musical work is to use conventional sheet music in which each tone is represented by a note. This method involves the use of two senses, sight and hearing. However, sheet music provides a two-dimensional depiction of music.

A shortcoming of the generally known methods and systems for recording and studying music is their failure to communicate the essential characteristics of a musical work in a manner that it is readily understandable by a student. A primary object of the present invention is to provide an improved musical visualization system that makes complex musical compositions more understandable to a student.

SUMMARY OF THE INVENTION

An improved method and system for more readily determining the various characteristics of a musical work is provided by this invention. This improved method and system provides a graphical representation of a musical work so that qualities of a musical work, such as tone, tonality and harmony, can readily be determined. Included within the graphical representation of a musical work may be a graph of the tones, harmonies and tonalities as a function of time. This graph may also be color coded to depict the harmony, tone and tonality of the sounds of a musical work. These graphical representations may be referred to as "audiographs" or "soundscapes."

This disclosure provides a description of a system utilized to build the geometric representation of a musical work, along with the method of controlling various visual effects based on properties of the musical work. The characteristics of a musical work are represented as a number of voices. Each voice can store a melodic voice, the harmony, tonality, dynamic information, etc. An application has been developed for entering this data in a convenient manner. The characteristics are read by the visualization software at startup, and a geometric database is constructed using some of the voice information while other voices are utilized to influence factors during playback. The composition can either be viewed in real time or one frame at a time (for recording to videotape or generating multimedia movies).

According to a preferred embodiment of this invention, a graphical representation of a musical work is created that appears as a three dimensional illustration of a musical work. This method includes selecting a musical work and determining its musical characteristics. The characteristics may include the tones, the harmonies and the tonalities as they occur as a function of time. These musical characteristics may be numerically coded and stored in a programmable computer memory, such as a computer disk cartridge or a permanently installed computer memory. After the musical characteristics are stored on a programmable computer memory, the memory can be used to control a computer to create a graphical representation of the musical work.

Each sound in a musical work typically has a tone, a harmony and a tonality. A scaled numeric table that assigns a scaled numeric value to the tones, harmonies and the tonalities of a musical work can be created. Each sound in the musical work can then be assigned a tonal value, a harmony value and a tonality value corresponding to its scaled table value. These assigned values can be inputted into the memory of a computer or stored on a computer disk and used to control a computer, as mentioned above, to create a graphical representation of a musical work.

According to one aspect of this invention, the graphical representation created by the computer from the programmable memory includes a graph that has three axes; one axis is time, another is tone and the third is harmony. As mentioned above, each of the assigned values of tone, harmony and tonality for each sound of a musical work can be stored as a function of time on a programmable computer memory. Each of these values can be graphed as coordinates by the computer to form the graphical depiction of a musical work. In a preferred embodiment of this invention, the graph appears as a three dimensional depiction of a musical work.

In order to create this three dimensional illustration of a musical work, a system generally includes a computer and a programmable memory storage device containing the musical characteristics that can be used to control the computer. The computer may have a display to display the graph produced by the microprocessor of the computer. In addition, the computer may have an audible playing device for playing the music as it is being graphically depicted as a function of time. In a preferred embodiment of this invention, the playing device plays the music in synchronism with the graph.

In addition to creating a scaled numeric table corresponding to the coordinates on the graph, a scaled numeric color table can also be created. In this table each tone, harmony and tonality is assigned a color. The sounds of a musical work can then be assigned a numeric tonal color value, harmonic color value and tonality color value. These numeric color values can be inputted into a computer or stored on a computer programmable memory. The memory can then control the microprocessor to color the graphical representation depicted above according to the assigned color values.

Other features of the present invention are described below.

BRIEF DESCRIPTION OF THE DRAWINGS

FIGS. 4A–4G are an exemplary scaled numeric table that can be used to convert the characteristics of a musical work into a programmable computer code to be stored on a readable computer memory;

FIG. 5 is an exemplary scaled color chart that can be used to convert the sounds of a musical work into a programmable computer code that is stored on a readable computer memory;

DETAILED DESCRIPTION OF PREFERRED EMBODIMENTS

A. Overview

Figure 1:
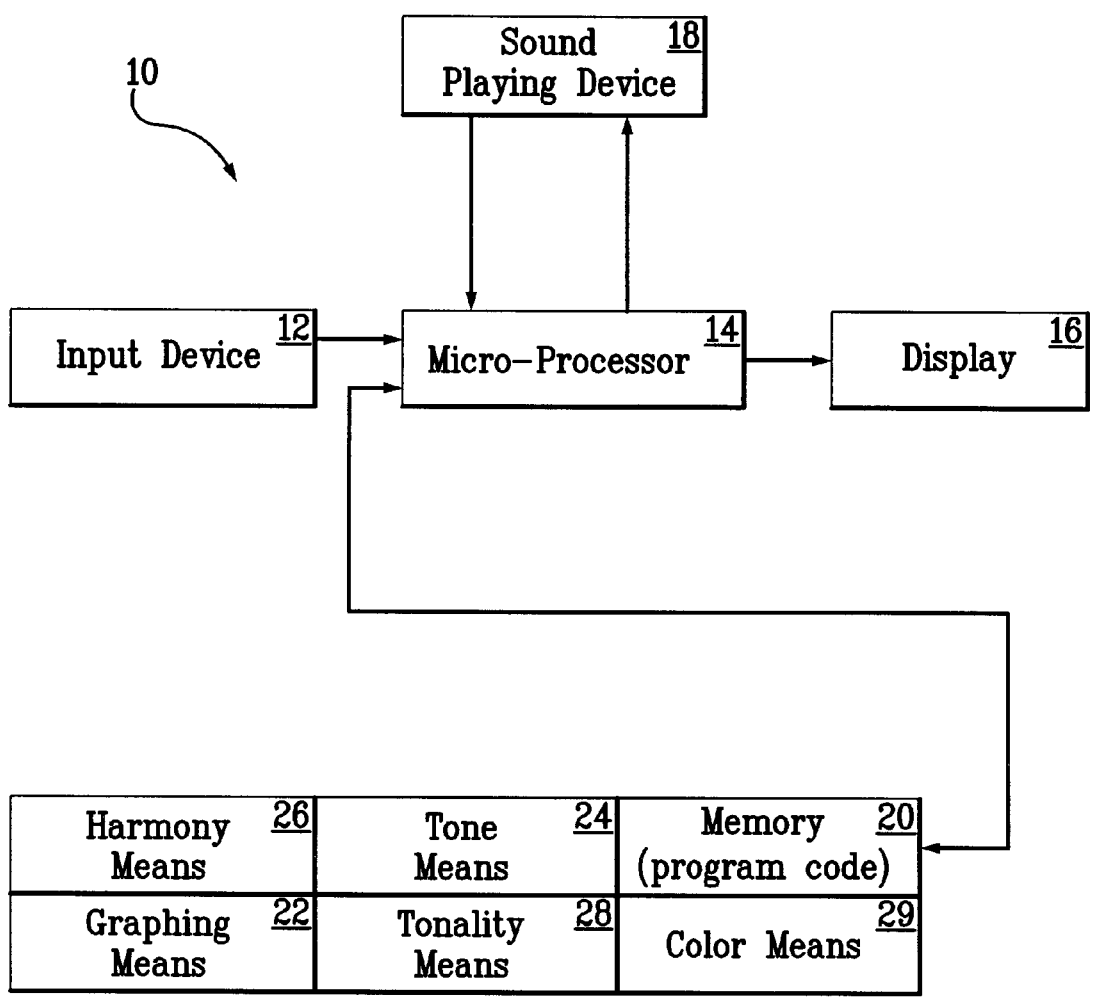
FIG. 1 is a block diagram of a preferred embodiment of the system of this invention.
Figure 2:
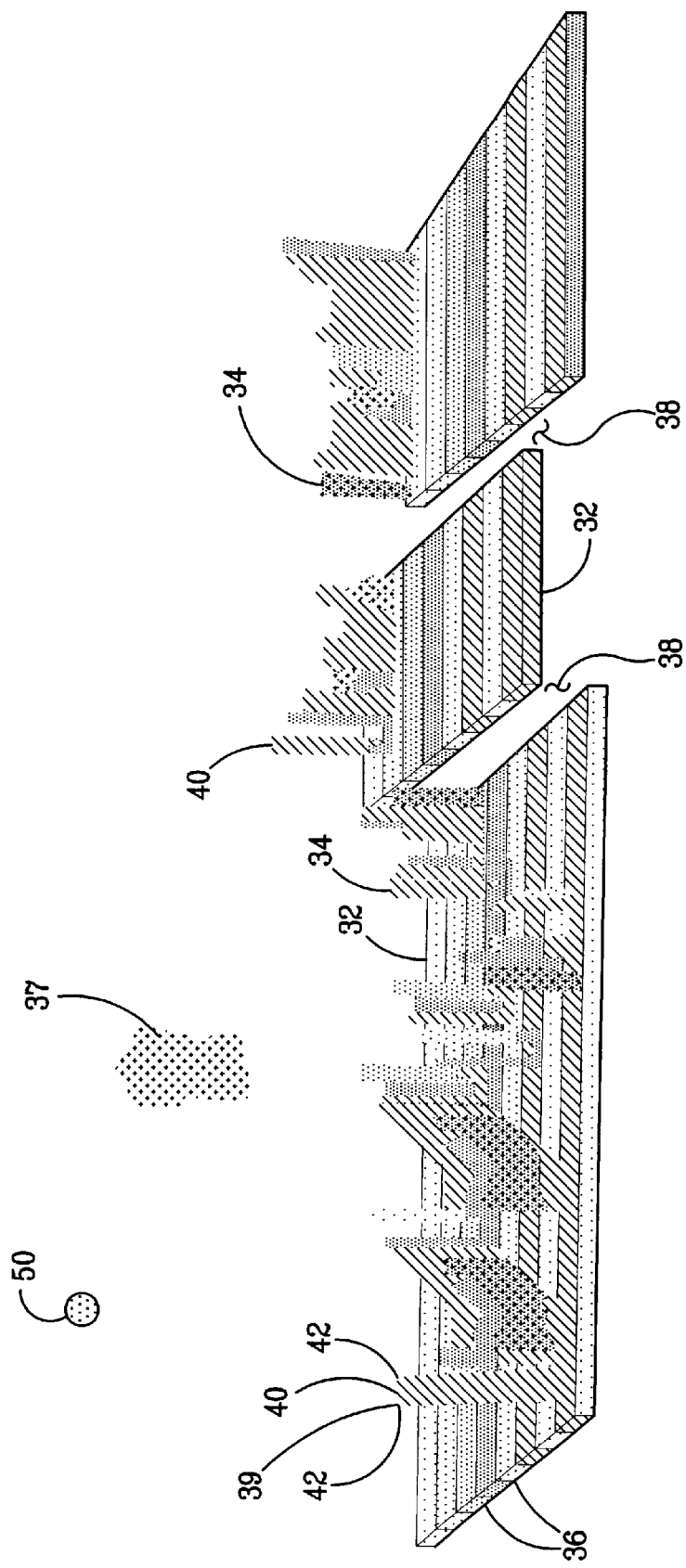
FIG. 2 illustrates a graphical representation of a musical work that can be formed with the preferred embodiment of FIG. 1.

Referring to the drawings, wherein like reference numerals designate like elements throughout the views, and referring in particular to FIG. 1, a system 10 for graphically illustrating a musical work includes an input device 12, a microprocessor 14, a display 16, a sound playing device 18 and a memory storing programmed code 20 that controls the operation of the microprocessor 14. The input device 12 may be a typical keyboard, a computer mouse or like device. The microprocessor 14 may be a conventional microprocessor that interfaces with the input device 12 to receive the inputted data. Stored on the memory 20 may be programmed code that corresponds to the musical characteristics of a musical work. This memory 20 can be used to control the microprocessor 14 to graph the various characteristics of a musical work. As is described in more detail below, the display 16 can be used to illustrate the graph created by the microprocessor 14 from the memory 20. The output of the display 16 may be a graphical representation of a musical work termed an audiograph, as is depicted in FIG. 2. The entire system 10 may be embodied in a personal computer, laptop computer, notebook computer or the like.

The memory 20 may be a permanently installed memory, such as a computer hard drive. Alternatively, the memory 20 may be a portable storage medium, such as a computer disk cartridge, a compact disk cartridge or the like. The characteristics of each sound of a musical work can be stored on this memory 20, and the memory 20 can communicate with the microprocessor 14 to create a graphical representation of the musical work.

In a preferred embodiment, the system 10 may also include a sound playing device 18, such as a "CD-ROM" player. The microprocessor 14 can generate the graphical representation of a musical work on the display 16 while simultaneously playing the musical work. As a result, each sound can be visually depicted as it is being heard.

Figure 3:
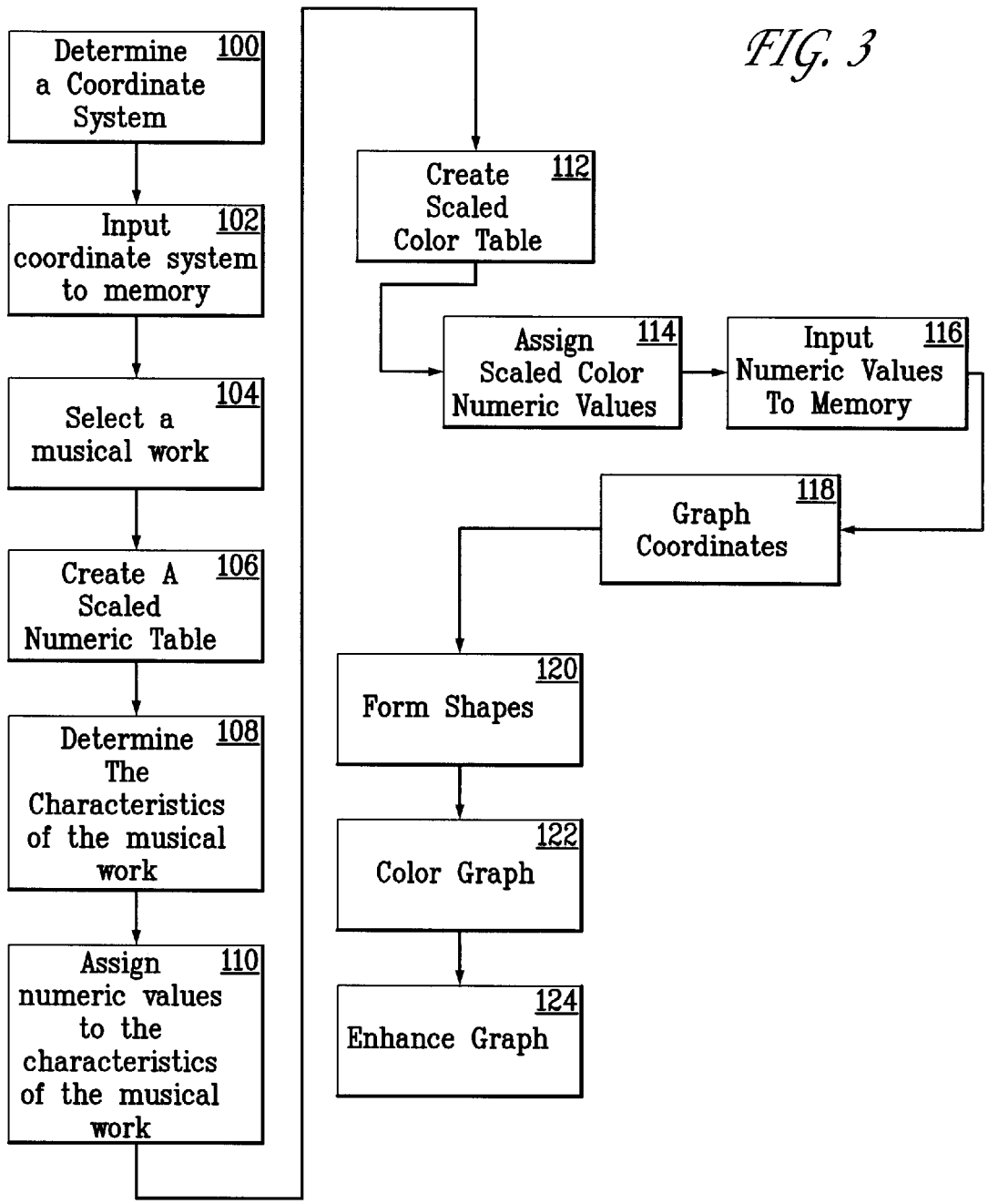
FIG. 3 is a flow chart depicting a preferred embodiment of the method of this invention.

A flow chart illustrating a preferred method of creating a graphical representation of a musical work is shown in FIG. 3. This method includes determining a three dimensional coordinate system (step 100) in which a musical work will be displayed. In a preferred embodiment, the coordinate system has three dimensions. However, other coordinate systems maybe selected including two dimensional systems. Preferably, the three dimensional coordinate system has three axes which include a time axis, a tone axis and a harmony axis. This coordinate system can be coded and inputted into the programmable memory 20 (step 102).

After determining a coordinate system (step 100) a musical work to be depicted may be selected (step 104). In order to graphically display the selected musical work, a scaled numeric table is created (step 106) that is indicative of the musical characteristics of the sounds of the selected musical work. Such characteristics may include, the tone, the harmony and the tonality of each sound as it occurs as a function of time in the musical composition. The scaled numeric table may be created by assigning a numeric value to the tones, harmonies and tonalities that may occur within the selected musical work. These values can be assigned with a conventional spread sheet computer program.

An exemplary scaled numeric table is shown in FIGS. 4A–4G. By way of example, this table can be created by assigning the tone "C" in the third octave a value of 1 and then assigning the subsequent whole tones within the same octave a value that is greater than the value of the preceding whole tone by a magnitude of five. For example, the tone "D" has a value of six, and the tone "E" has a value of 11. The flat and sharp variations of each note can be assigned a number in between the value of the whole note to which they correspond and the value of the whole notes above and below the corresponding whole note. In the next octave, values can be assigned in a similar fashion. The value of each of these tones is referred to as the tonal value.

Similarly, the scaled numeric table may have a listing of values which correspond to the numeric value of each harmony. These values are referred to as the harmonic values. The harmonic values can be assigned in a similar fashion to the assignment of the tonal values. In the preferred embodiment shown in FIGS. 4A, 4C and 4E, some of the major harmonics and minor harmonics are each assigned values in a scaled fashion.

Since tonality is the loyalty to a certain tone, the tonality values can be readily determined form the tonal values. For instance, if the tonality of a musical work at a certain point in time is "C" in the third octave, then the tonality value is 1.

In order to visually display a selected musical work with the scaled numeric table, the characteristics of the sounds of a musical work are analyzed as a function of time (step 108). For example, at a certain time each sound will have a tone, a tonality and a harmony. By using the scaled numeric table, the numeric values indicative of the tone, the tonality and the harmony of each sound can be determined (step 110). In particular, a tone value indicative of the tone, a harmony value indicative of the harmony and a tonality value indicative of the tonality for each sound is determined by finding the appropriate value in the scaled numeric table.

Assigning a tonality value to each sound is conducted as follows. Listed in columns D–I of FIG. 4A are the notes or tones. Thus, if the central tone or tonality of a composition is C in the third octave, then a tonality value of 1 is assigned, and if the central tone is G in the third octave, then a tonality value of 19 is assigned.

The tone values are also assigned with reference to columns D through I. These tone values may also be referred to as the melodic code. As can be seen the tone value varies for each note depending upon the octave in which it is being played. For example, in the fourth octave a tone represented by the letter E has a value of 42 and in the sixth octave it has a value of 104.

Depicted in columns K–AJ of FIGS. 4A, 4C and 4E are the harmonic values. Similar to the tonality and the tone values, the harmony values of each sound can be determined from these columns of the spreadsheet. For example, the tone of D in the seventh major harmonic has a value of 601 and in the thirteenth major harmonic D has a value of 60.

In addition to assigning each sound a numeric tone, harmony and tonality value, each sound can also be assigned a color value. These color values can be used to color the graph created by the computer a color that is indicative of the tone, harmony and tonality of each sound. By way of illustration, a scaled color chart that assigns a color to the sounds, as is shown in FIG. 5, can be created (step 112). Listed in the first column is each note or tone, and listed in the second column is the harmony at which that tone occurs. The tonal values for the various tones are also listed in the last column entitled "Melodic code nos." Listed in the column entitled RGB No., or red, green and blue number, is the color values that correspond to computer code. These color values can be stored on a readable computer memory and from the stored color values the corresponding color can be selected. In order to find a color and the computer code associated with a particular tone, either the tone or the tonal value can be used and the corresponding color and color value selected (step 114). For instance, the tone "B" (tonal values 29, 60, 91, 122 153 and 184) in the major harmonic has a color of medium orchid and color values of 86, 85 and 21. Using a spreadsheet program, each sound of the selected musical work can be assigned a numeric value or color tonal value from the scaled color chart (step 114).

After the selection of the tone value, the harmony value and the tonality value for each sound of a musical work, these values can be stored, as a function of time on a computer readable memory 20, such as a permanently installed memory within a computer or a portable memory device (step 116). For instance, the numeric tone values can be stored on the tone means 24 of the memory, the numeric harmony means can be stored on the harmony means 26 of the memory and the numeric tonality values can be stored on the tonality means 28 of the memory. The color values of a particular sound can also be inputted into a color means 29 disposed within the memory 20 (step 116).

As partially shown in FIG. 1, the graphing means 22 of the memory 20 may include Performer, a visual simulation tool kit developed by Silicon Graphics, Inc. and be used to control a computer or microprocessor 14 to graphically illustrate a musical work (step 118). The characteristics of each sound of a musical work can be graphed by the graphing means 22 by retrieving the data stored on the tone means 24, the harmony means 26 and the tonality means 28 and graphing this data in accordance with the stored coordinate system. In a preferred embodiment, the stored coordinate system has a tone axis 31a, a harmony axis 31b and a time axis 31c, as illustrated in FIG. 6.

Figure 6:
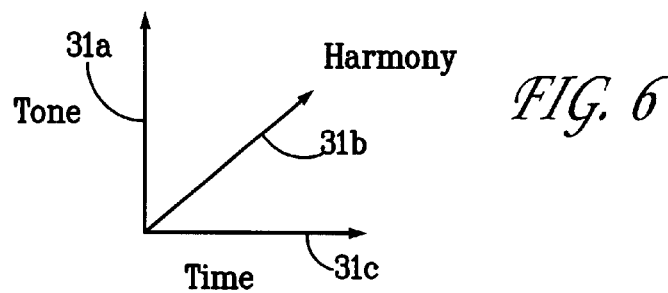
FIG. 6 illustrates the axes of a three dimensional graph that can be used in a preferred embodiment of this invention.

The tone and the harmony means 24, 26 operate in conjunction with the graphing means 22 to control the microprocessor 14 to graph the numeric tone value and the numeric harmony value associated with each sound as a function of time, on a three dimensional graph according to the coordinate system shown in FIG. 6 (step 118). The graphing means 22 and the tonality means 28 control the microprocessor 14 to graph the numeric tonality value of each sound as a function of time on the coordinate system of FIG. 6 (step 118). As is described in more detail below, from these graphed coordinates the memory 20 and the microprocessor 14 can form shapes (step 120). Following the formation of shapes, the memory 20 and the microprocessor 14 can color the graph (step 122) colors corresponding to the respective numeric color values for each sound.

The graphing means 22 may create a graphical representation by reading the stored data directly and generating the graph "on the fly" or in real time as the musical work is being played. Camera control, clipping, and other visual effects take place as the composition is being played. As the simulation proceeds, each of the appropriate date channels is checked against the current simulation time, and corresponding changes to the graphical environment are made.

After graphing these musical characteristics as a function of time, a three dimensional graph or audiograph as illustrated in FIG. 2 is created. The audiograph shown in FIG. 2 is an edited portion of Beethoven's Symphony No. 5 in C-minor. As is evident from FIG. 2, the audiograph comprises a plurality of geometric shapes. One of these shapes is known as the platform 32. The platform 32 is indicative of the tonality of the composition. Also displayed on the graph are shapes 34 that generally take the form of a parallelogram, and more particularly a rectangle. These shapes 34 indicate the tone and harmony of each sound. In particular, the height of each parallelogram relative to the tone axis 31a is indicative of the tone, and the depth of each parallelogram relative to the harmony axis 31b indicates the harmony. Furthermore, as indicated by the different shadings in FIG. 2, the audiograph may be colored. These colors correspond to the stored numeric color values and are indicative of the tones, harmony and tonality that are occurring in a musical composition. For instance, each platform 32 comprises a plurality of colonized planks 36 that indicate the harmonies. Each rectangle 34 or parallelogram that extends from the platform 32 to the tone value at the time of that sound is colored according to the sound's tone and harmony. The construction of these shapes from the memory 20 is described in further detail below.

As shown in FIG. 2, the tonality of a musical composition may suddenly shift as indicated by the reference numeral 38. This shifting is referred to as modulation, and is indicated in FIG. 2 by the discontinuity in the platforms.

The mood or affect of a musical work at a given point in time may also be displayed. A mood or affect of a musical work is the feeling the music creates in a listener. For example, a musical work may make a listener feel happy or sad. These affects are displayed in the audiograph of FIG. 2 as background colors at a certain point in time and are represented by the codings and the reference numeral 37. In order to graph the affects with the graphing means 22, a scaled affects table can be created similar to the one shown in columns AK–AL of FIGS. 4F and 4G. Column AK lists a variety of affects, and column AM lists a variety of colors. The color that is listed in a certain row in column AM is indicative of the affect that is in the same row. For instance, in row 16 the color dark blue represents depression.

In order to display these affects on the graphical representation, the musical work is analyzed to determine the affect created at a given point in time. The affect for each given point in time is found in column AL, and the numerical code value assigned in column AK is selected. This numerical value and its time can then be inputted to the color means of the memory 20, as computer readable code. For instance, depression has the code value of 28, and this value along with its given point in time can be inputted to the color means 29. The graphing means 22 can read this data stored on the color means 29, and display ambient colors for the given point in time on the graphical representation that are indicative of the affect corresponding to the stored numeric value.

B. Determining the Coordinates

Figure 7:
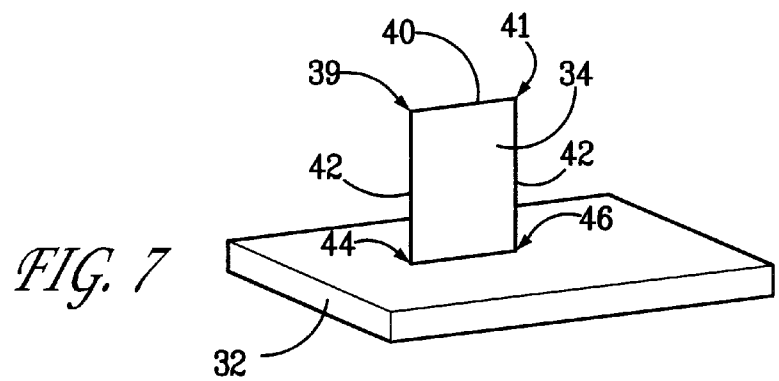
FIG. 7 illustrates a shape that can be graphically depicted with the embodiment of this invention illustrated in FIG. 1.

By using a simulation tool kit, as referenced above, the memory 20 can control the microprocessor 14 to graph each of the inputted coordinates (step 118). As discussed above, in order to create an audiograph, a tone value and a harmony value are stored on the memory 20. The memory 20 controls the microprocessor 14 to graph the tone and the harmony values as follows. The tone means 24 stores the tone value that corresponds to a tone at a certain point in time, and the harmony means 26 stores a harmony value that corresponds to the harmony at the same point in time. These means 24, 26, along with the graphing means 22 control the microprocessor 14 to graph a point that is indicative of the tone and the harmony at that point in time. As shown in FIG. 7, this point is labeled 39. A line 40, as shown in FIG. 2, is extended from this coordinate to the end time of the sound a length equal to the time duration of the respective tone (step 120). This line has an end point denoted with the reference numeral 41. A three-dimensional shape can then be formed by the graphing means 22 by first creating the tonality platforms (step 120), as described below, and then connecting each tonal line 40 to a platform by extending a line 42 parallel to the tonal axis from the beginning point 39 and the ending point 41 of each line 40 (step 120). This process is repeated to graph each of the stored tone values and harmony values as a function of time.

C. The Platform

As mentioned above, base platforms 32 can be depicted on the graph that correspond to the tonality of each sound. The totality of each sound of a musical work can be inputted to the memory 20 and the memory 20 can control the microprocessor 14 to graph each tonality as a function of time (step 118). More particularly, the tonality means 28 indicates the tonality value at a certain time, and the graphing means 22 controls the microprocessor 14 to graph this tonality value. The tonalities appear as platforms 32 on the graph or planes that are parallel to the tone equals zero plane.

Figure 8:
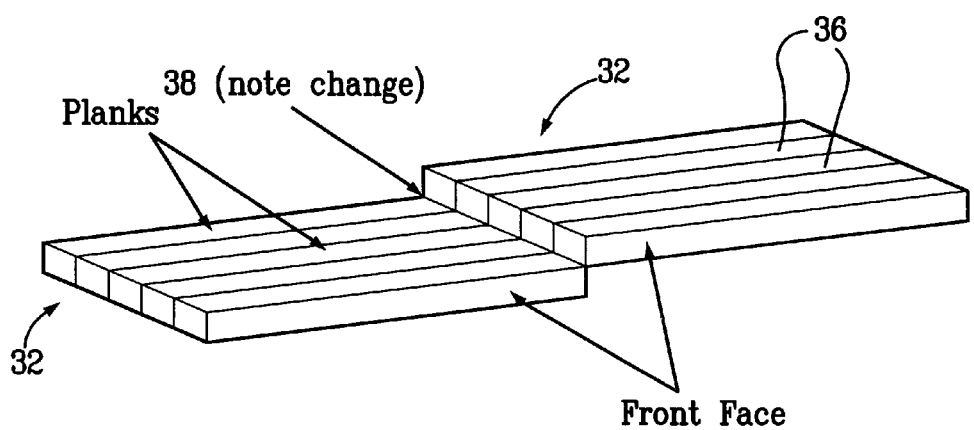
FIG. 8 illustrates another shape that can be graphically depicted with the embodiment of this invention illustrated in FIG. 1.

The geometric shapes depicted in the audiograph in FIG. 2 are comprised of "planks 36," as shown in FIGS. 2 and 8. Each plank 36 correlates to a specific harmony. When a tone is made at a certain harmony, the tone can be graphed as described above (step 118). A graphical shape 32 can then be formed by connecting the tonal line 40 described above to the plank of the platform that is indicative of the tonality and harmony that occur when that tone is being played (step 120).

D. Determining the Color of the Shapes

In addition to illustrating the tone and the harmony of each sound of a musical work as a shape 34 on a three dimensional graph, the tone and the harmony of each sound can be depicted with color (step 122). As described above, the memory 20 may have a stored color value for each sound that corresponds to its tone, harmony and tonality. The color means 29 and the graphing means of the memory 20 can control the microprocessor 14 to color the audiograph according to the stored color values.

The color means 29 and the graphing means 22 color the graph as follows. Referring to FIG. 7, vertices 39 and 41 are assigned the color of the graphed melodic note or tone, vertex 44 is assigned the color of the coordinate's harmonic value at the time corresponding to the beginning of the note, and vertex 46 inherits the color of the harmonic value at the end of the note. The color means may control the microprocessor 14 to fade the color between these points in order to show a smooth transition. For example, in FIG. 2, the various codes on the audiograph represents a different color. Thus, as can be seen the colors are faded between the top and bottom of the rectangles based on the different codings.

The platforms 32 can also be colored. Each plank 36 of a platform 32 can be assigned a different color that corresponds to the different harmonies. Thus, when a coordinate is located above a plank, the bottom of the rectangle formed from that coordinate will have the color value that corresponds to that harmony. In addition the face or side of the platform, can a be colored a color that is indicative of the tonality.

E. Additional Graphical Effects

There are many graphical techniques that can be used to enhance the basic geometry defined by the above algorithm (step 124). For example, "fog/hazing" colorization can be used. Fog/hazing refers to creating varying degrees and colors of haze to underscore aspects of the visually displayed musical composition. Underscoring with color may have a strong impact on the perceived mood of the composition.

In addition, point lights can be used to highlight important events or notes. This includes emphasizing certain aspects by creating transient point lights directly on the graph.

Clipping may also be used. Clipping refers to hiding portions of the graph until the correct time by placing a clipping plane in the graphical environment. This can be used to synchronize graph visibility with a musical recording. For example, a graph of a musical work can be generated simultaneously with the playing of the selected musical work. In order to do this, a computer is equipped with a standard playing device, such as a CD-ROM disk drive, and plays the music as the graph is generated. Thus, each sound of a musical work can be seen visually and heard simultaneously. Camera control may be used to focus on various geometrical aspects of the graph in order to highlight characteristics of a musical composition. Elevation and angle of the camera may be used in similar ways to emphasize various aspects of a musical composition.

Texture Mapping refers to information about orchestration and can be represented by superimposing textures on the graph, such as wrinkles, bumps, cross-hatched lines, or the lites. Furthermore, surface attributes such as glossiness, specular highlights, and transparency can be defined for each note.

Other musical characteristics may also be illustrated on the graphical representation. For instance the dynamic and the orchestration can also be depicted. They can be shown by first creating a scaled numeric table for the orchestration and the dynamic. From the scaled numeric table, the orchestration and the dynamic may be assigned a value. These values can then be stored on the memory 20 and the graphing means 22 can use these stored values to control the microprocessor 14 to graph these musical characteristics as a function of time. An exemplary scaled table is illustrated in FIGS. 4B and 4D. For example, if the orchestration is flute, a value of 3 can be assigned, and this value can be inputted into the memory 20. Similarly, if the dynamic is equal to "pp," a value of 3 is assigned. These orchestration and dynamic values can inputted into the memory 20. In a preferred embodiment, the dynamic level is represented graphically by the distance the audiograph appears from the viewer. The closer the audiograph, the louder the given dynamic level.

Another feature that may be represented on the graphical representation is the stress pattern of a musical work. The stress pattern refers to the number of beats within a bar of a musical work. Some stress patterns are listed in FIG. 4B. By way of illustration, an explanation of the stress pattern "4//4 1-2-3-4P" is provided. The first numeral of the pattern 4//4 indicates the number of beats within a bar, and the second numeral indicates the beat that is stressed. Thus, in the pattern 4//4 there are four beats within the bar, and the fourth beat gets the stress or "beat," as it is referred to by musicians. The numerals 1-2-3-4 indicate each beat. The underlining indicates which beats gets accented. These stress patterns can be stored on the memory 20 and indicated by the graphing means 22 in a variety of ways. For example, the stress patterns may be indicated by a light or circular color in the background of the graph whose intensity is indicative of the stress pattern. Such a light is shown in FIG. 2 and denoted with the reference numeral 50. Alternatively, the stress pattern can be illustrated by the relative movement of the graph as it moves from right to left across a display. For example, the graph may move quicker or slower depending upon the particular stress pattern.

F. CONCLUSION

The present invention aids the user in appreciating and understanding musical works. A colorful, graphic musical notation, understandable after only a few minutes of practice, provides for analysis, visualization and explanatory commentary of ideas and concepts that have shaped musical masterpieces of all eras. These ideographic representations are reproducible on plain paper, photographic slides or prints, video tapes, CD-ROMS or Laser Disks. They provide animated, three-dimensional, color-coded moving pictures of musical works by any composer including Machaut, Josquin, Stravinsky and Bartòk. These audiographs clearly and dramatically portray melodic lines, harmonic and tonal progressions, rhythms, dynamic levels, timbres, textures, and also affective, expressive and interpretive properties. Text underlay, agogic markings, tempo and metronome markings, and notes on elapsed time sectors also are available. Commentary, stage directions and dialogue may also be reproduced. Ordinary music lovers, school children and college students will find this graphic notation a vital new means for developing their musical understanding.

This invention may also be used with the Internet by storing the computer code corresponding to a musical work at a web site. Through a computer browser or like device, the web site may be accessed and the computer code can then be down loaded. This computer code can then use one of the graphing programs, such as Performer, mentioned above to graph the musical work. Alternatively, the computer code can be stored in a computer and a graphing program can be placed on a web site. Similarly, the web site can be accessed and the graphing program can use the stored computer data to graphically display the musical work. Of course, both the computer code of a musical work, and the graphical program can be contained on a single web site and used to graphically depict a musical work.

The preferred embodiments described herein are illustrative only and, although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

I claim:

1. A system comprising:
(a) a computer;
(b) a display coupled to the computer;
(c) a computer readable storage device containing program code and data for controlling the computer to generate a graphical representation of a musical work in the display, the graphical representation comprising the musical work's tone, harmony, and tonality as functions of time;
(d) a means for audibly playing the musical work in synchronism with a progression of the graphical representation; and
(e) a commentary on the musical work.

2. The system of claim 1, wherein the musical work comprises a plurality of sounds.

3. The computer of claim 1, wherein the graphical representation further comprises a tone axis, a harmony axis and a time axis.

4. The system of claim 1, wherein the graphical representation further comprises an indicator that synchronizes the graphical representation with the audible playing.

5. The system of claim 2, wherein the graphical representation further comprises platforms that are indicative of the tonality of the sounds of the musical work.

6. The system of claim 2, wherein the graphical representation further comprises colors that are indicative of the tone, the harmony and the tonality of the sounds.

7. The system of claim 2, wherein the graphical representation further comprises a graph having a tone axis, a harmony axis, a time axis, and a plurality of colored shapes disposed on the graphical representation that each have a location, the location of each shape relative to the tone axis being indicative of the tone of one of the sounds and the location of each shape relative to the harmony axis being indicative of the harmony of one of the sounds and the color of each shape being indicative of the tone and the harmony of one of the sounds.

8. A system comprising:
(a) a computer;
(b) a display coupled to the computer;

(c) a computer readable storage device containing program code and data for controlling the computer to generate a graphical representation of a musical work in the display, ($c_1$) the musical work comprising a plurality of sounds that each have a tone, a harmony and a tonality;

($c_2$) the graphical representation comprising a tone axis, a harmony axis and a time axis on which the tones, the harmonies and the tonalities of the plurality of sounds of the musical work are graphed as a function of time, the graphical representation further comprising an indicator that synchronizes the graphical representation with an audible playing;

($c_3$) a plurality of colored shapes disposed on the graphical representation that each have a location, the location of each shape relative to the tone axis being indicative of the tone of one of the sounds and the location of each shape relative to the harmony axis being indicative of the harmony of one of the sounds;

($c_4$) at least one colored platform disposed on the graphical representation that has a position, the position of the platform relative to the tone axis being indicative of the tonality of one of the sounds and the color of the platform being indicative of the tonality of one of the sounds;

($c_5$) a means for audibly playing the musical work in synchronism with a progression of the graphical representation; and ($c_6$) a means for providing commentary on the musical work.

9. A computer readable memory for controlling the operation of a computer to generate a graphical representation of a musical work that has a plurality of sounds that each have a tonality, a tone, and a harmony, comprising:

a harmony means for storing harmony data as a function of time that is indicative of the harmony of the sounds;

a tone storing means for storing tone data as a function of time that is indicative of the tone of the sounds;

a tonality storing means for storing tonality data as a function of time that is indicative of the tonalities of the sounds;

a graphing means for graphing the tonality data stored on the tonality storing means, the harmony data stored on the harmony storing means, and the tone data stored on the tone storing means as a function of time on the graphical representation, the graphical representation having a time axis, a tone axis and a harmony axis, the graphical representation further having an indication that synchronizes the graphical representation with the audible playing;

a means for audibly playing the musical work in synchronism with a progression of the graphical representation; and a commentary means for storing data that corresponds to commentary on the musical work.

10. The computer readable memory of claim 9, further comprising a color means for storing color data that corresponds to a color that is indicative of the tones and the harmonies of the sounds and wherein the graphing means colors shapes disposed on the graphical representation colors according to the stored color data.

11. A method of producing a graphical representation of a musical work having a plurality of sounds that occur as a function of time, comprising:

determining tonality, tone, and harmony of the sounds of the musical work;

assigning a numeric tone value to each tone;

assigning a numeric harmonic value to each harmony;

assigning a tonality value to each tonality;

creating the graphical representation by graphing the tonality value, the tone value and the harmony value of each sound as a function of time;

displaying the graph;

audibly playing the musical work in synchronism with a progression of the graphical representation; and providing commentary on the musical work.

12. The method of claim 11, further comprising the step of creating a scaled numeric table that has the tone values and the harmonic values.

13. The method of claim 11, further comprising the step of creating a scaled numeric color table that has color values that are indicative of the tones and the harmonies of the sounds.

14. The method of claim 13, further comprising the step of assigning a color value from the scaled numeric color table that is indicative of the tones of the sounds.

15. The method of claim 14, further comprising the step of coloring the graphical representation according to the assigned color value.

16. The method of claim 11, further comprising the steps of assigning a color value that is indicative of the affect of the musical work at a given time and coloring an ambient of the graphical representation at the given time a color that is indicative of the color value.

17. The method of claim 11, further comprising the step of selecting the musical work before the step of determining.

18. The method of claim 11, further comprising the step of inputting the tone values and the harmony values as a function of time into a computer readable memory before the step of creating.

19. The method of claim 11, wherein said step of determining tonality, tone, and harmony of the sounds of the musical work is accomplished by visual inspection of the musical work.

20. The method of claim 11, further comprising indicating a synchronization of the graphical representation with the audible playing.

21. A system comprising:

(a) a computer;

(b) a display coupled to the computer; and (c) a computer readable storage device containing program code and data for controlling the computer to generate commentary on a musical work, and a graphical representation of the musical work in the display, the musical work having a plurality of sounds that each have a harmony, a tone and a tonality;

(d) the graphical representation comprising a tone axis, a harmony axis and a time axis on which a plurality of colored shapes that each have a location and at least one colored platform that has a position are disposed, the location of each shape relative to the tone axis being indicative of the tone of one of the sounds, the location of each shape relative to the harmony axis being indicative of the harmony of one of the sounds, the color of each shape being indicative of the tone and the harmony of one of the sounds, the position of the platform relative to the tone axis being indicative of the tonality of one of the sounds and the color of the platform being indicative of the tonality of one of the sounds, the graphical representation further comprising an indication that synchronizes the graphical representation with the audible playing; and (e) a means for audibly playing the musical work in synchronism with a progression of the graphical representation.

\* \* \* \* \*